(12) United States Patent
Shin et al.

(10) Patent No.: US 10,684,521 B2
(45) Date of Patent: Jun. 16, 2020

(54) DISPLAY DEVICE

(71) Applicant: SAMSUNG DISPLAY CO., LTD., Yongin-si (KR)

(72) Inventors: Donghee Shin, Asan-si (KR); Hyungjin Song, Hwaseong-si (KR); Byoungsun Na, Seoul (KR); Yoomi Ra, Ansan-si (KR); Soohong Cheon, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/162,368

(22) Filed: Oct. 16, 2018

(65) Prior Publication Data

US 2019/0227399 A1 Jul. 25, 2019

(30) Foreign Application Priority Data

Jan. 24, 2018 (KR) .......................... 10-2018-0008675

(51) Int. Cl.
*G02F 1/1362* (2006.01)
*G02F 1/1368* (2006.01)
(Continued)

(52) U.S. Cl.
CPC ...... *G02F 1/136286* (2013.01); *G02F 1/1368* (2013.01); *G02F 1/134309* (2013.01);
(Continued)

(58) Field of Classification Search
CPC ......... G02F 1/134309; G02F 1/136213; G02F 1/136286; G02F 1/1368; G02F 2201/121;
(Continued)

(56) References Cited

U.S. PATENT DOCUMENTS 7,522,226 B2 4/2009 Park et al.
2007/0002249 A1* 1/2007 Yoo .................. G02F 1/134363
349/141
(Continued)

FOREIGN PATENT DOCUMENTS

KR  10-2007-0019457  2/2007
KR  10-2008-0050704  6/2008
(Continued)

*Primary Examiner* — Richard J Hong
(74) *Attorney, Agent, or Firm* — H.C. Park & Associates, PLC

(57) ABSTRACT

A display device including: a first substrate; a gate line extending along a first direction on the first substrate; a data line disposed on the first substrate, insulated from the gate line, and extending along a second direction that intersects the first direction; a gate electrode protruding from the gate line; a source electrode extending from the data line; a drain electrode spaced apart from the source electrode; a pixel electrode electrically connected to the drain electrode; and a storage electrode spaced apart from the gate line and the gate electrode. The drain electrode includes a first overlap portion overlapping the gate electrode and a second overlap portion overlapping the storage electrode, and the second overlap portion overlaps at least a part of the pixel electrode.

18 Claims, 13 Drawing Sheets

(51) Int. Cl.
*G02F 1/1343* (2006.01)
*G09G 3/36* (2006.01)
(52) U.S. Cl.
CPC ..... *G02F 1/136213* (2013.01); *G09G 3/3648* (2013.01); *G02F 2201/121* (2013.01); *G02F 2201/123* (2013.01); *G09G 2310/0264* (2013.01)
(58) Field of Classification Search
CPC ......... G02F 2201/123; G02F 1/133345; G02F 1/136259; G02F 1/134336; G02F 1/134363; G09G 2310/0264; G09G 3/3648; G09G 3/3659; H01L 27/124
See application file for complete search history.

(56) References Cited

U.S. PATENT DOCUMENTS

| | | | | |
|---|---|---|---|---|
| 2008/0001877 | A1* | 1/2008 | Kim | G02F 1/136213 345/87 |
| 2008/0024406 | A1* | 1/2008 | Kim | G02F 1/136259 345/87 |
| 2009/0310047 | A1* | 12/2009 | Shin | G09G 3/3659 349/37 |
| 2009/0310076 | A1* | 12/2009 | Hsieh | G02F 1/134309 349/144 |
| 2010/0149475 | A1* | 6/2010 | Kim | G02F 1/134336 349/123 |
| 2010/0296015 | A1* | 11/2010 | Kim | G02F 1/134309 349/37 |
| 2014/0353605 | A1* | 12/2014 | Kim | H01L 27/124 257/40 |
| 2018/0045999 | A1* | 2/2018 | Hao | G02F 1/133345 |

FOREIGN PATENT DOCUMENTS

| | | |
|---|---|---|
| KR | 10-1232618 | 2/2013 |
| KR | 10-1401452 | 5/2014 |

* cited by examiner

DISPLAY DEVICE

CROSS-REFERENCE TO RELATED APPLICATION

This application claims priority from and the benefit of Korean Patent Application No. 10-2018-0008675, filed on Jan. 24, 2018, which is hereby incorporated by reference for all purposes as if fully set forth herein.

BACKGROUND

Field

Exemplary embodiments of the present invention relate to a display device, and more particularly, to a display device capable of improving display quality.

Discussion of the Background

A liquid crystal display ("LCD") device is one of the most widely used types of flat panel display ("FPD") devices. Such an LCD device includes two substrates on which electrodes are formed thereon and a liquid crystal layer interposed therebetween. An LCD device is a display device that adjusts the amount of transmitted light by applying voltage to the two electrodes and rearranging liquid crystal molecules of the liquid crystal layer.

The LCD device includes a plurality of pixels, and each pixel includes a thin film transistor serving as a switch, and a capacitor. The capacitor includes a liquid crystal capacitor, which is a capacitance component of the liquid crystal, a storage capacitor which compensates for the charge storage capability of the liquid crystal capacitor, and a parasitic capacitor which is formed between a gate line and source and drain electrodes.

When a signal applied to the gate line is on, the thin film transistor in the pixel is turned on and an image signal is applied to the pixel through a data line. The liquid crystal capacitor and the storage capacitor in the pixel are charged by the applied image signal, and a pixel voltage changes accordingly.

When the signal applied to the gate line is off, the thin film transistor in the pixel is turned off such that the pixel voltage becomes a float state, and the pixel voltage falls by a kickback voltage due to a parasitic capacitor. In recent times, as display devices have become larger in size with improved image quality, the size of each individual pixel has become smaller, and the magnitude of the storage capacitance and the parasitic capacitance may largely fluctuate due to mask misalignment. Depending on the magnitude of the storage capacitance and the parasitic capacitance, the kickback voltage may vary, and accordingly, the display quality of the display device may be degraded.

The above information disclosed in this Background section is only for understanding of the background of the inventive concepts, and, therefore, it may contain information that does not constitute prior art.

SUMMARY

Exemplary embodiments of the present invention provide a display device capable of compensating for a kickback voltage to improve display quality.

Additional features of the inventive concepts will be set forth in the description which follows, and in part will be apparent from the description, or may be learned by practice of the inventive concepts.

An exemplary embodiment provides: a first substrate; a gate line extending along a first direction on the first substrate; a data line disposed on the first substrate, insulated from the gate line, and extending along a second direction that intersects the first direction; a gate electrode protruding from the gate line; a source electrode extending from the data line; a drain electrode spaced apart from the source electrode; a pixel electrode electrically connected to the drain electrode; and a storage electrode spaced apart from the gate line and the gate electrode. The drain electrode includes a first overlap portion overlapping the gate electrode and a second overlap portion overlapping the storage electrode, and the second overlap portion overlaps at least a part of the pixel electrode.

The drain electrode may include a non-overlap portion extending from the second overlap portion and not overlapping the storage electrode and the gate electrode.

The non-overlap portion may include: a first non-overlap portion positioned between the first overlap portion and the second overlap portion; and a second non-overlap portion extending in a direction away from the first non-overlap portion.

The drain electrode may have an "I" shape.

The first overlap portion may have a length of about 3 μm to about 5 μm in the first direction, and the second overlap portion may have a length of about 20 μm to about 40 μm in the first direction.

A length of the second overlap portion overlapping the storage electrode may increase as a distance away from the first overlap portion increases.

A length of at least a portion of the second overlap portion overlapping the storage electrode may gradually increase as a distance away from the first overlap portion increases.

The non-overlap portion may include: a first non-overlap portion extending from the first overlap portion and not overlapping the pixel electrode; and a second non-overlap portion overlapping at least a portion of the pixel electrode.

The drain electrode may be bent.

The first overlap portion may have a length of about 3 μm to about 5 μm in the second direction, and the second overlap portion may have a length of about 20 μm to about 40 μm in the second direction.

A length of the second overlap portion overlapping the storage electrode may gradually increase as a distance away from the first overlap portion increases.

The first overlap portion may have an area of about 1/13 to about 1/4 of an area of the second overlap portion.

Another exemplary embodiment provides a display device including: a first substrate; a gate line disposed on the first substrate and extending along a first direction; a data line disposed on a second substrate, the data line extending along a second direction that intersects the first direction; a gate electrode protruding from the gate line; a storage electrode spaced apart from the gate electrode, a source electrode extending from the data line; and a drain electrode spaced apart from the source electrode, and including a first overlap portion overlapping the gate electrode, a second overlap portion overlapping the storage electrode, and a non-overlap portion extending from the first overlap portion and the second overlap portion and not overlapping the storage electrode. The non-overlap portion includes a first non-overlap portion extending from the first overlap portion and not overlapping the pixel electrode, and a second non-overlap portion extending from the second overlap portion and overlapping at least a portion of the pixel electrode.

The drain electrode may have an "I" shape.

The first overlap portion may have a length of about 3 μm to about 5 μm in the first direction, and the second overlap portion may have a length of about 20 μm to about 40 μm in the first direction.

A length of the second overlap portion overlapping the storage electrode may increase as a distance away from the first overlap portion increases.

A length of at least a portion of the second overlap portion overlapping the storage electrode may gradually increase as a distance away from the first overlap portion increases.

The drain electrode may be bent.

The first overlap portion may have a length of about 3 μm to about 5 μm in the second direction, and the second overlap portion may have a length of about 20 μm to about 40 μm in the second direction.

A length of the second overlap portion overlapping the storage electrode may gradually increase as a distance away from the first overlap portion increases along the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
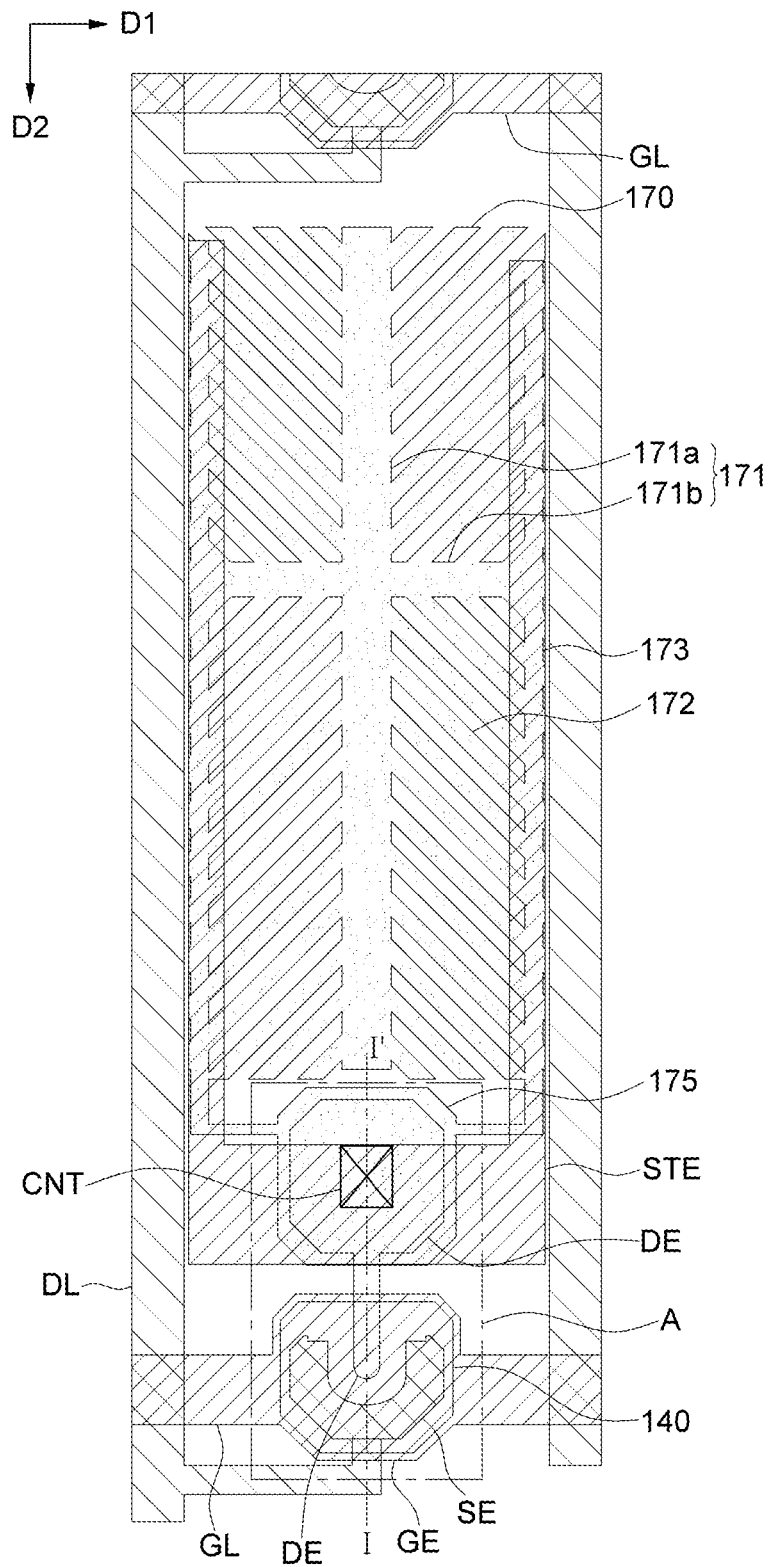
FIG. 1 is a plan view illustrating one pixel of a display device according to an exemplary embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a display device according to an exemplary embodiment will be described in detail with reference to FIGS. 1 to 6.

Figure 2:
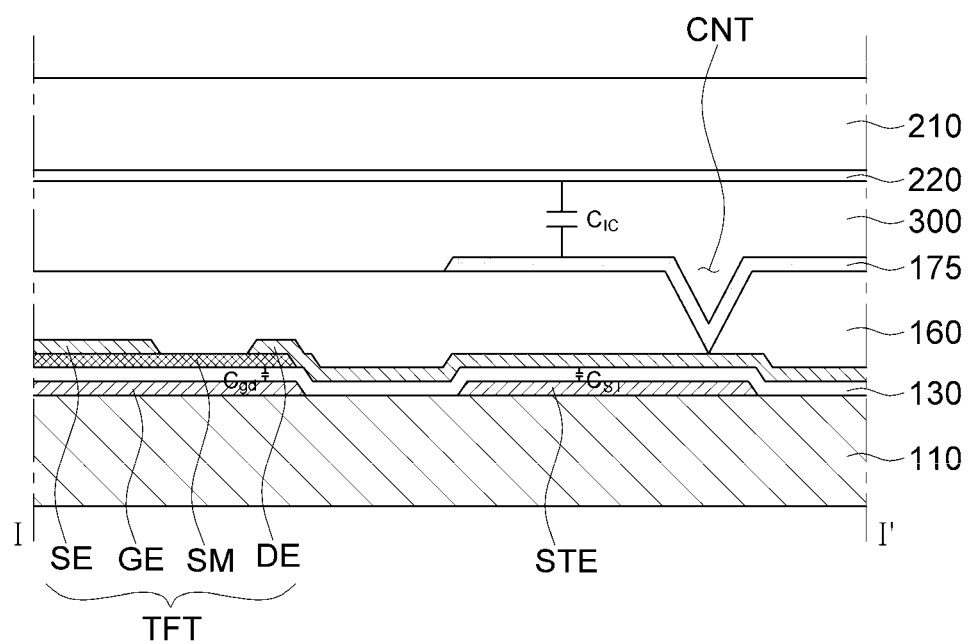
FIG. 2 is a cross-sectional view taken along line I-I' in FIG. 1.

FIG. 1 is a plan view illustrating one pixel of a display device according to an exemplary embodiment of the present invention, and FIG. 2 is a cross-sectional view taken along line I-I' in FIG. 1.

A display device according to an exemplary embodiment of the present invention includes a gate line GL, a data line DL, a first substrate 110, a thin film transistor TFT, a gate insulating layer 130, a storage electrode STE, a pixel electrode 170, a second substrate 210, a common electrode 220, and a liquid crystal layer 300, as illustrated in FIGS. 1 and 2.

The thin film transistor TFT includes a gate electrode GE, a semiconductor layer SM, a source electrode SE, and a drain electrode DE. The gate electrode GE is connected to the gate line GL, the source electrode SE is connected to the data line DL, and the drain electrode DE is connected to the pixel electrode 170.

The gate line GL, the gate electrode GE, and the storage electrode STE are located on the first substrate 110.

The gate line GL extends along a first direction D1 on the first substrate 110. Although not illustrated, an end portion of the gate line GL may be connected to another layer or an external driving circuit. In such an exemplary embodiment, the end portion of the gate line GL may have a larger area than an area of another portion of the gate line GL for connection with another layer or an external driving circuit. The gate line GL may include substantially the same material and may have substantially the same structure (a multilayer structure) as those of the gate electrode GE. In other words, the gate line GL and the gate electrode GE may be formed substantially simultaneously in substantially the same process.

The gate electrode GE may have a shape that protrudes from the gate line GL. The gate electrode GE and the gate line GL may be formed as a single unit.

The gate electrode GE may include or be formed of one of: aluminum (Al) or alloys thereof, silver (Ag) or alloys thereof, copper (Cu) or alloys thereof, or molybdenum (Mo) or alloys thereof. Alternatively, the gate electrode GE may include or be formed of one of: chromium (Cr), tantalum (Ta), and/or titanium (Ti). In an exemplary embodiment, the gate electrode GE may have a multilayer structure including at least two conductive layers that have different physical properties.

The storage electrode STE may be disposed on a plane, and between adjacent gate lines GL and between adjacent data lines DL. At least a part of the storage electrode STE overlaps the drain electrode DE on a plane.

The storage electrode STE may receive a certain voltage.

The storage electrode STE may extend along a second direction D2 that intersects the first direction D1 to overlap at least a part of the pixel electrode 170. For example, as illustrated in FIG. 1, the storage electrode STE may be disposed to enclose the pixel electrode 170 on at least three sides.

The storage electrode STE may have one of "I" shape, a "C" shape, or a "U" shape. The storage electrode STE having a "U" shape is illustrated in FIG. 1, and a convex portion of the storage electrode STE is directed toward the gate line GL.

The gate insulating layer 130 is disposed on the first substrate 110, the gate electrode GE, the gate line GL, and the storage electrode STE, as illustrated in FIG. 2. In such an exemplary embodiment, the gate insulating layer 130 may be disposed over the entire surface of the first substrate 110 including the gate electrode GE, the gate line GL, and the storage electrode STE.

The gate insulating layer 130 may include or be formed of silicon nitride ($SiN_x$) or silicon oxide ($SiO_x$). The gate insulating layer 130 may have a multilayer structure including at least two insulating layers having different physical properties.

The semiconductor layer SM is located on the gate insulating layer 130, as illustrated in FIG. 2. The semiconductor layer SM overlaps at least a part of the gate electrode GE.

The semiconductor layer SM may include polycrystalline silicon, amorphous silicon, or the like. Alternatively, the semiconductor layer SM may include or be formed of one of polycrystalline silicon and oxide semiconductors such as indium-gallium-zinc oxide (IGZO) or indium zinc tin oxide (IZTO).

As illustrated in FIG. 1, the data line DL extends along the second direction D2 on the gate insulating layer 130. Although not illustrated, an end portion of the data line DL may be connected to another layer or an external driving circuit. In such an exemplary embodiment, the end portion of the data line DL may have a area greater than an area of another portion of the data line DL.

The data line DL may include or be formed of a refractory metal, such as molybdenum, chromium, tantalum, titanium, and/or an alloy thereof. The data line DL may have a multilayer structure including a refractory metal layer and a low resistance conductive layer. Examples of the multilayer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In an alternative exemplary embodiment, the data line DL may include or be formed of any suitable metals and/or conductors rather than the aforementioned materials.

The data line DL is disposed along the second direction D2 and intersects the gate line GL located along the first direction D1. Although not illustrated, a portion of the data line DL that crosses the gate line GL may have a width less than a width of another portion of the data line DL, and a portion of the gate line GL that crosses the data line DL may have a width less than a width of another portion of the gate line GL. Accordingly, a parasitic capacitance between each of the data lines DL and each of the gate lines GL may be reduced.

The source electrode SE is disposed on the gate insulating layer 130 and the semiconductor layer SM. The source electrode SE overlaps the semiconductor layer SM and the gate electrode GE. The source electrode SE may extend from the data line DL and may be bent to have a shape protruding toward the pixel electrode 170. The source electrode SE may be formed unitarily with the data line DL. Although not illustrated, the source electrode SE may be a part of the data line DL.

The source electrode SE may have one of an "I" shape, a "C" shape and a "U" shape. The source electrode SE having a "U" shape is illustrated in FIG. 1, and a convex portion of the source electrode SE is directed toward the gate line GL.

The source electrode SE may include a substantially same material and may have a substantially same structure (a multilayer structure) as those of the data line DL. The source electrode SE and the data line DL may be substantially simultaneously formed in a substantially same process.

The drain electrode DE is disposed on the gate insulating layer 130 and the semiconductor layer SM at a predetermined distance from the source electrode SE. The drain electrode DE overlaps the semiconductor layer SM and the gate electrode GE. A channel area of the thin film transistor TFT is located between the drain electrode DE and the source electrode SE.

The drain electrode DE is electrically connected to the pixel electrode 170. Specifically, the drain electrode DE is electrically connected to a connection electrode 175 of the pixel electrode 170 through a contact hole CNT.

The drain electrode DE may include substantially the same material and may have substantially the same structure (a multilayer structure) as those of the data line DL. The drain electrode DE, the source electrode SE, and the data line DL may be substantially simultaneously formed in substantially the same process.

According to an exemplary embodiment of the present invention, as illustrated in FIGS. 1 and 2, at least a portion of the drain electrode DE overlaps the gate electrode GE, and another portion of the drain electrode DE overlaps the storage electrode STE, which will be described in detail with reference to FIGS. 4 and 6.

Although not illustrated, an ohmic contact layer may be disposed between the semiconductor layer SM and the source electrode SE and between the semiconductor layer SM and the drain electrode DE. The ohmic contact layer lowers an interface resistance between the semiconductor layer SM and the source electrode SE.

The ohmic contact layer may include or be formed of silicide or n+ hydrogenated amorphous silicon doped with n-type impurities, e.g., phosphorus (P) and hydrogen fluoride ($PH_3$), at high concentration.

Although not illustrated, a protective layer may be disposed on each of the data line DL, the source electrode SE, the drain electrode DE, and the gate insulating layer 130. In such an embodiment, the protective layer may be disposed over the entire surface of the first substrate 110 including each of the data lines DL, the source electrode SE, the drain electrode DE, the pixel electrode 170, and the gate insulating layer 130.

The protective layer may include or be formed of an inorganic insulating material, e.g., silicon nitride ($SiN_x$) or silicon oxide ($SiO_x$). In such an exemplary embodiment, an inorganic insulating material having photosensitivity and a dielectric constant of about 4.0 may be used. Alternatively, the protective layer may have a double-layer structure including a lower inorganic layer and an upper organic layer, which is found to impart excellent insulating characteristics of an organic layer and not to damage an exposed portion of the semiconductor layer SM. The protective layer may have a thickness greater than or equal to about 5000 Å, e.g., in a range from about 6000 Å to about 8000 Å.

An insulating interlayer 160 is disposed on the data line DL, the source electrode SE, the drain electrode DE and the semiconductor layer SM, as illustrated in FIG. 2.

The insulating interlayer 160 may include an organic layer having a low dielectric constant. For example, the insulating interlayer 160 may include a photosensitive organic material having a dielectric constant lower than that of the protective layer.

Referring to FIG. 2, the pixel electrode 170 is disposed on the insulating interlayer 160. The pixel electrode 170 is connected to the drain electrode DE through the connection electrode 175. The connection electrode 175 is electrically connected to the drain electrode DE through the contact hole CNT.

The pixel electrode 170 may include or be formed of a transparent conductive material, such as indium tin oxide (ITO) or indium zinc oxide (IZO). In such an exemplary embodiment, ITO may be a polycrystalline material or a monocrystalline material, and IZO may also be a polycrystalline material or a monocrystalline material. Alternatively, IZO may be an amorphous material.

The pixel electrode 170 may include a first stem electrode 171a, a second stem electrode 171b, a branch electrode 172, an auxiliary stem electrode 173, and the connection electrode 175.

The first stem electrode 171a may extend along the first direction D1, and the second stem electrode 171b may extend along the second direction D2. Accordingly, the first stem electrode 171a may intersect the second stem electrode 171b.

The branch electrode 172 may extend from the first and second stem electrodes 171a and 171b obliquely with respect to the first and second directions D1 and D2.

The auxiliary stem electrode 173 may extend from an end portion of at least one branch electrode 172 and may be connected to the connection electrode 175.

The connection electrode 175 overlaps at least a portion of the storage electrode STE. The connection electrode 175 contacts the drain electrode DE through the contact hole CNT to be electrically connected to the drain electrode DE.

The liquid crystal layer 300 may be disposed between the first substrate 110 and the second substrate 210, as illustrated in FIG. 2. The liquid crystal layer 300 may include liquid crystal molecules having negative dielectric anisotropy and aligned vertically. Alternatively, the liquid crystal layer 300 may include a photopolymerizable material, and in such an embodiment, the photopolymerizable material may be a reactive monomer or a reactive mesogen.

Although not illustrated, a light blocking layer may be disposed on the second substrate 210. The light blocking layer may overlap the gate line GL, the data line DL, and the thin film transistor TFT. In other words, the light blocking layer may overlap each gate line GL, each data line DL, and each thin film transistor TFT. The light blocking layer may be disposed on the first substrate 110 instead of the second substrate 210. The light blocking layer may include a black photosensitive resin.

Although not illustrated, a color filter may be disposed on the second substrate 210 corresponding to the pixel electrode 170. An edge of the color filter may be disposed on the gate line GL and the data line DL. The color filter may be one of a red color filter, a green color filter, a blue color filter, and a white color filter. The color filter may be disposed on the first substrate 110 instead of the second substrate 210. The color filter may include a photosensitive resin of any of the above-mentioned colors (red, green, blue and white).

The common electrode 220 may be disposed over an entire surface of the second substrate 210. The common electrode 220 may include or be formed of a transparent conductive material such as indium tin oxide (ITO) or indium zinc oxide (IZO). In such an embodiment, ITO may be a polycrystalline material or a monocrystalline material, and IZO may also be a polycrystalline material or a monocrystalline material. The common electrode 220 is connected to a common line (not illustrated) of the first substrate 110 through a short portion (not illustrated). The common electrode 220 receives a common voltage from the common line (not illustrated) through the short portion (not illustrated).

Figure 3:
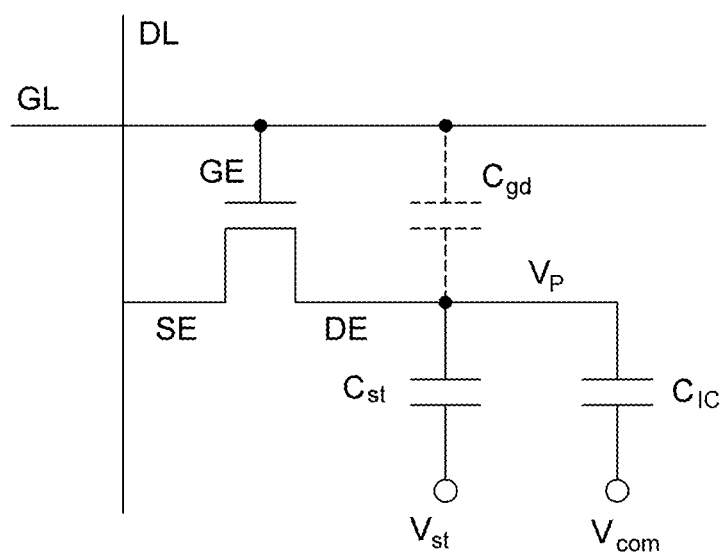
FIG. 3 is a circuit diagram illustrating an equivalent circuit of a pixel according to an exemplary embodiment of the present invention.

FIG. 3 is a circuit diagram illustrating an equivalent circuit of a pixel according to an exemplary embodiment of the present invention.

Referring to FIG. 3, one pixel includes the thin film transistor TFT connected to the gate line GL and the data line DL. In addition, one pixel includes a liquid crystal capacitor Clc, a storage capacitor Cst, and a parasitic capacitor Cgd.

The liquid crystal capacitor Clc is formed by overlap of the pixel electrode 170 and the common electrode 220. The liquid crystal layer 300 is controlled by the liquid crystal capacitor Clc to express a gray level of images.

The storage capacitor Cst is formed by overlap of the storage electrode STE and drain electrode DE, as shown in FIG. 2. The storage capacitor Cst is formed to maintain a voltage of the pixel electrode 170, and serves to supplement the charge storage capability of the liquid crystal capacitor Clc.

The parasitic capacitor Cgd is formed by overlap of the drain electrode DE and the gate electrode GE.

When a gate high voltage is applied to the gate line GL, the thin film transistor TFT in the pixel is turned on and a data voltage Vdata is applied to the pixel electrode 170 through the data line DL. Accordingly, the liquid crystal capacitor Clc and the storage capacitor Cst in the pixel are charged by the applied data voltage Vdata, thereby increasing a pixel voltage Vp. After a certain period of time, when a gate low voltage is applied to the gate line GL, the thin film transistor TFT is turned off. In such an exemplary embodiment, due to the transition of a gate voltage Vg, the pixel voltage Vp shifts in a transition direction of the gate voltage Vg. As used herein, a kickback voltage Vkb refers to an amount of change in the pixel voltage Vp. That is, the pixel voltage Vp applied to the pixel electrode 170 is lowered by the above-described kickback voltage Vkb.

A charge amount Qkb stored in the pixel before and after the gate low voltage is applied to the gate line GL is constant. Accordingly, the relationship between the difference ($\Delta Vg$) between the gate high voltage and the gate low voltage applied to the gate line GL and the kickback voltage ($\Delta Vkb$) satisfies the following Equation 1.

$$Qkb = (Cgd)\Delta Vg = (Cgd + Ccl + Cst)\Delta Vkb \quad \text{[Equation 1]}$$

In Equation 1, Qkb denotes the amount of charge stored in the pixel, Cgd denotes the parasitic capacitance, $\Delta Vg$ denotes a difference between the gate high voltage and the gate low voltage applied to the gate line GL, Clc denotes the capacitance of the liquid crystal capacitor, Cst denotes the capacitance of the storage capacitor, and $\Delta Vkb$ denotes the kickback voltage.

Accordingly, the kickback voltage ($\Delta Vkb$) depending on the amount of change of the gate voltage ($\Delta Vg$) applied to the gate line GL may be expressed by Equation 2.

$$\Delta Vkb = \frac{Cgd}{Cgd + Cst + Clc} \Delta Vg \quad \text{[Equation 2]}$$

Figure 4:
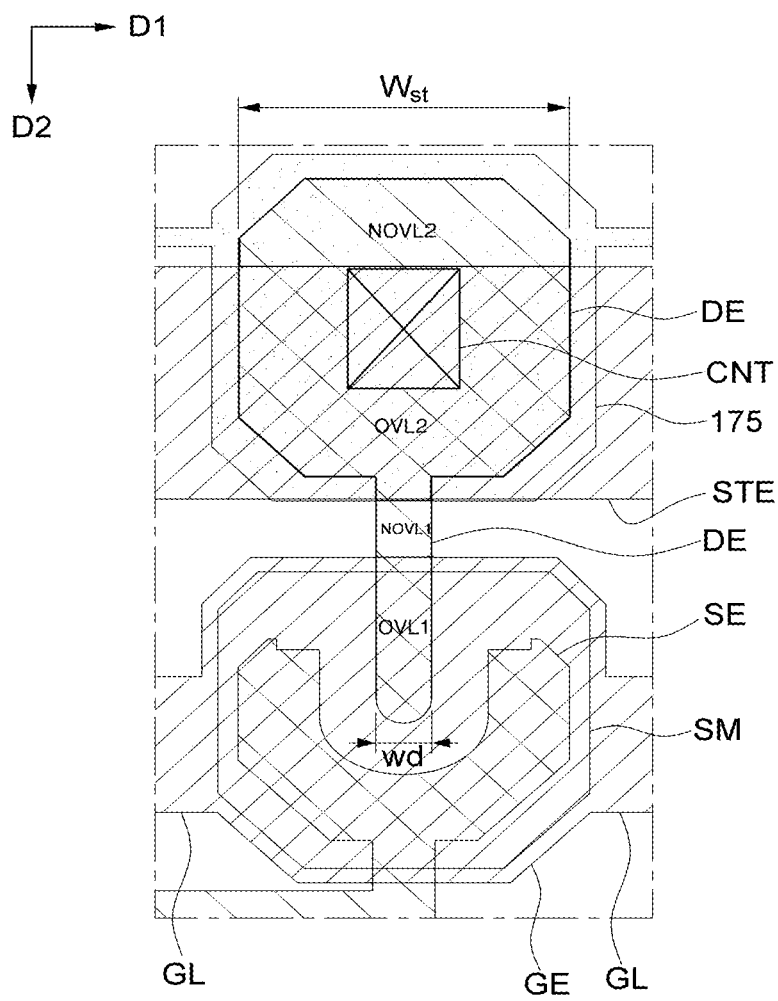
FIG. 4 is a view enlarging a portion "A" of FIG. 1.
Figure 5:
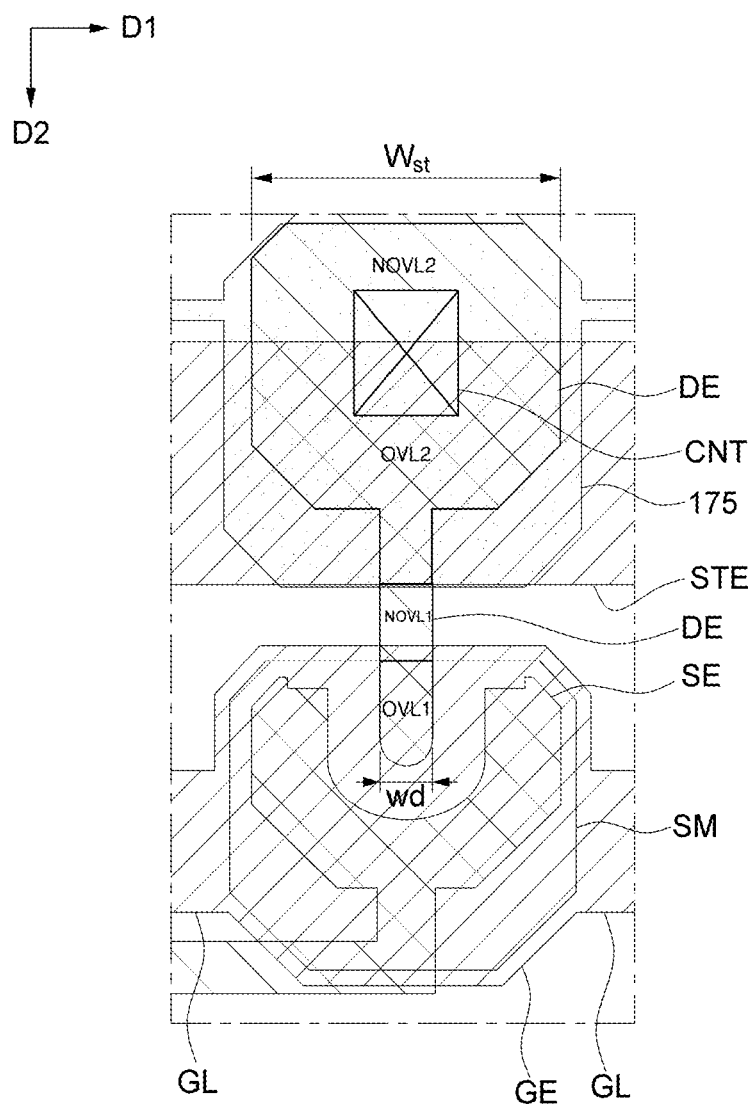
FIG. 5 and FIG. 6 are other enlarged views of the portion "A" of FIG. 1.
Figure 6:
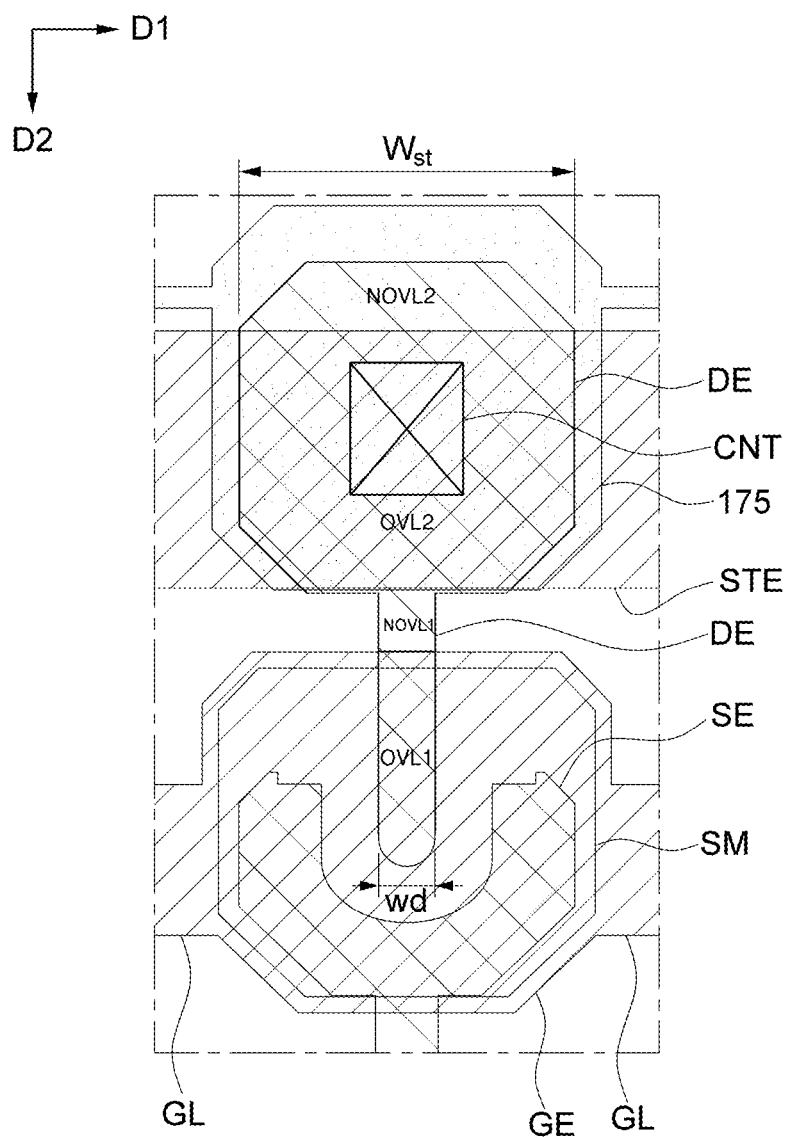

FIG. 4 is a enlarged view of a portion "A" of FIG. 1, and FIGS. 5 and 6 are other enlarged views of the portion "A" of FIG. 1.

According to an exemplary embodiment of the present invention, the drain electrode DE may have an "I" shape.

The drain electrode DE includes a non-overlap portion, a first overlap portion OVL1 overlapping the gate electrode GE, and a second overlap portion OVL2 overlapping the storage electrode STE.

The non-overlap portion includes a first non-overlap portion NOVL1 positioned between the first overlap portion OVL1 and the second overlap portion OVL2, and a second non-overlap portion NOVL2 extending in a direction away from the first non-overlap portion NOVL1. Specifically, the first non-overlap portion NOVL1 extends from the first overlap portion OVL1 and does not overlap the connection electrode 175 of the pixel electrode 170, and the second non-overlap portion NOVL2 overlaps the connection electrode 175 of the pixel electrode 170.

The first overlap portion OVL1 overlaps the gate electrode GE. The first overlap portion OVL1 has a width Wd of about 3 μm to about 5 μm. As used herein, the width Wd of the first overlap portion OVL1 means a length of the first overlap portion OVL1 in the first direction D1.

The second overlap portion OVL2 overlaps the storage electrode STE. The second overlap portion OVL2 has a width Wst of about 20 μm to about 40 μm. As used herein, the width Wst of the second overlap portion OVL2 means a length of the second overlap portion OVL2 in the first direction D1.

According to an exemplary embodiment of the present invention, the first overlap portion OVL1 in which the gate electrode GE overlaps the drain electrode DE forms the parasitic capacitor Cgd, and the second overlap portion OVL2 in which the storage electrode STE overlaps the drain electrode DE forms the storage capacitor Cst. In such an exemplary embodiment, a capacitance of the parasitic capacitor Cgd is proportional to an area of the first overlap portion OVL1, and a capacitance of the storage capacitor Cst is proportional to an area of the second overlap portion OVL2.

According to an exemplary embodiment, although the source electrode SE and the drain electrode DE are shifted in the second direction D2, as illustrated in FIGS. 5 and 6 because the mask is misaligned, a ratio of the area of the first overlap portion OVL1 to the area of the second overlap portion OVL2 may be substantially the same. That is, although the mask is misaligned and the source electrode SE and the drain electrode DE are shifted in the second direction D2, a ratio of the capacitance of the parasitic capacitor Cgd formed by the first overlap portion OVL1 to the capacitance of storage capacitor Cst formed by the second overlap portion OVL2 may be substantially the same. Accordingly, as shown in Equation 2, the kickback voltage Vkb, which is determined by the ratio of the parasitic capacitor Cgd to the sum of the parasitic capacitor Cgd, the storage capacitor Cst, and the liquid crystal capacitor Clc may have a constant value.

Hereinafter, a display device according to another exemplary embodiment of the present invention will be described with reference to FIGS. 7 to 11. The descriptions of the display device according to an exemplary embodiment of the present invention will be omitted from the descriptions of the display device according to another exemplary embodiment of the present invention.

Figure 7:
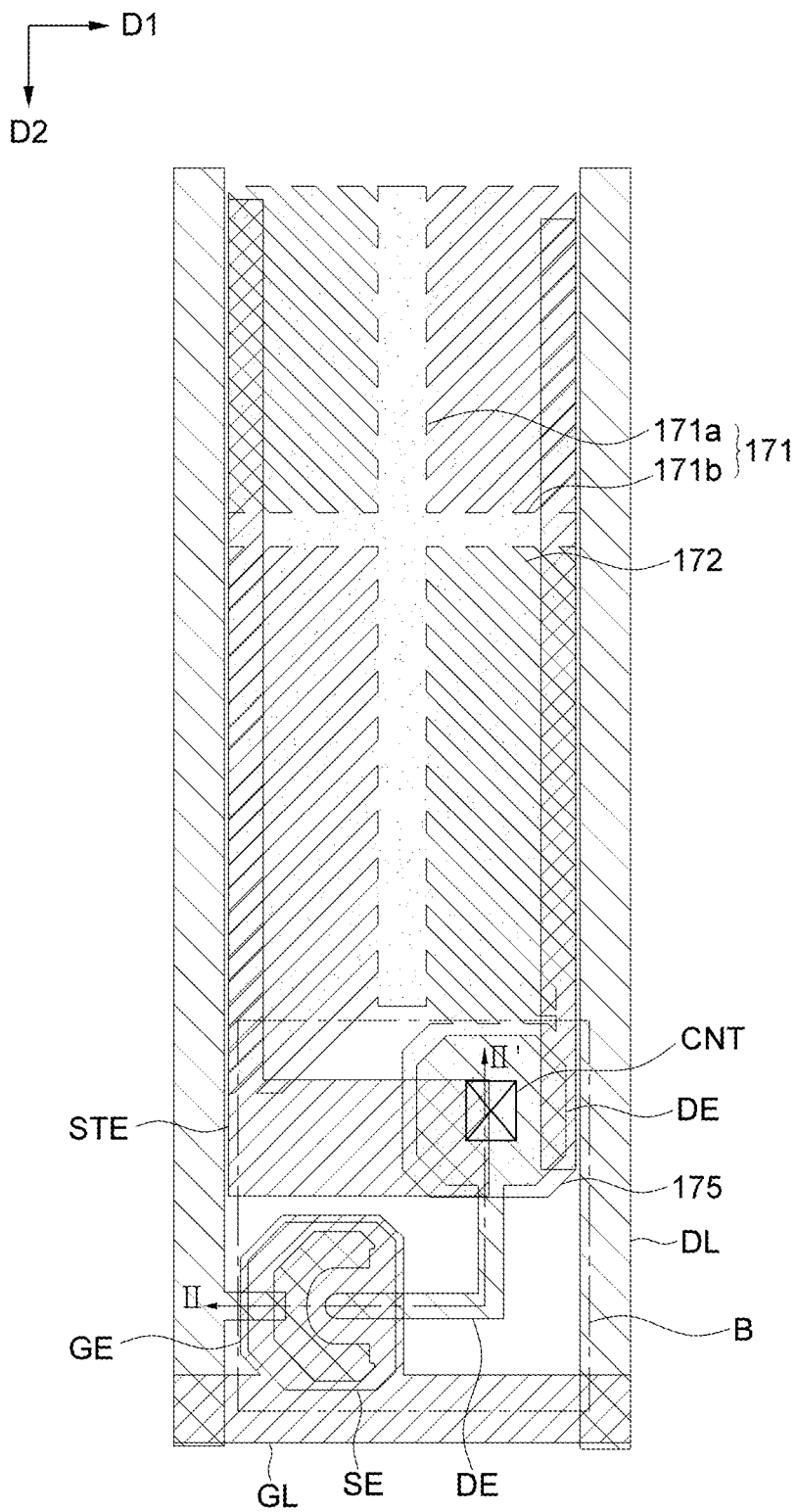
FIG. 7 is a plan view illustrating one pixel of a display device according to another exemplary embodiment of the present invention.
Figure 8:
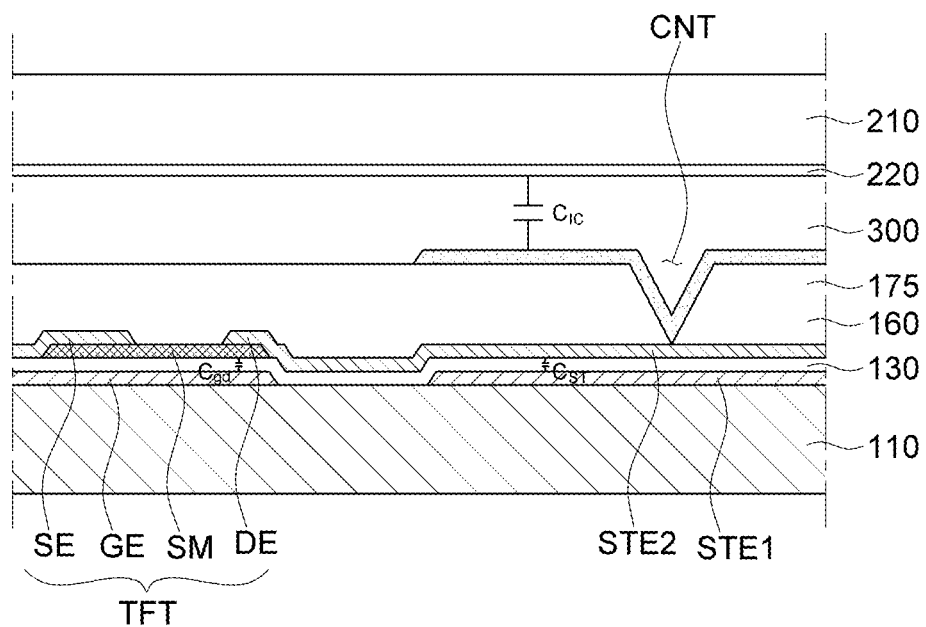
FIG. 8 is a cross-sectional view taken along line II-II' in FIG. 7.
Figure 9:
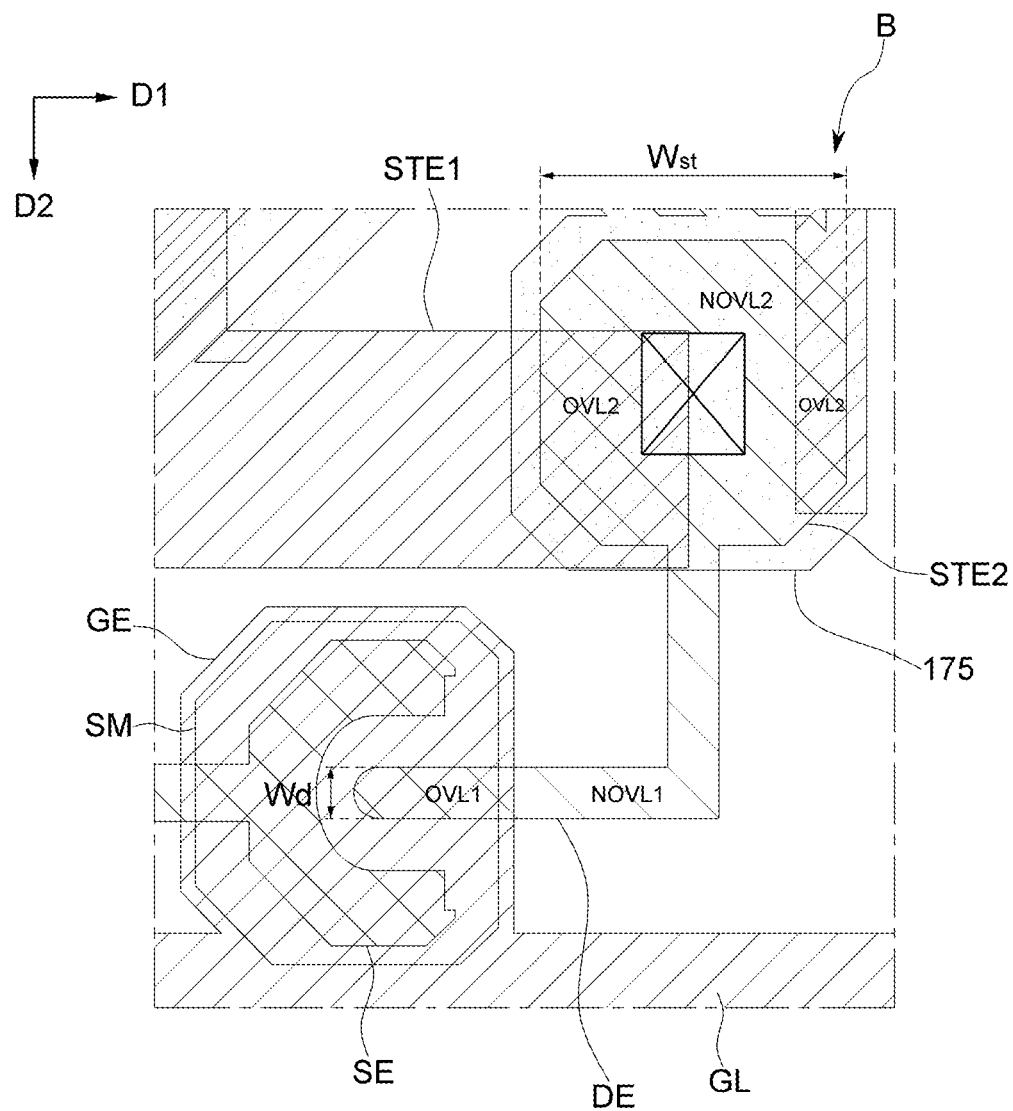
FIG. 9 is an enlarged view of a portion "B" of FIG. 7.
Figure 10:
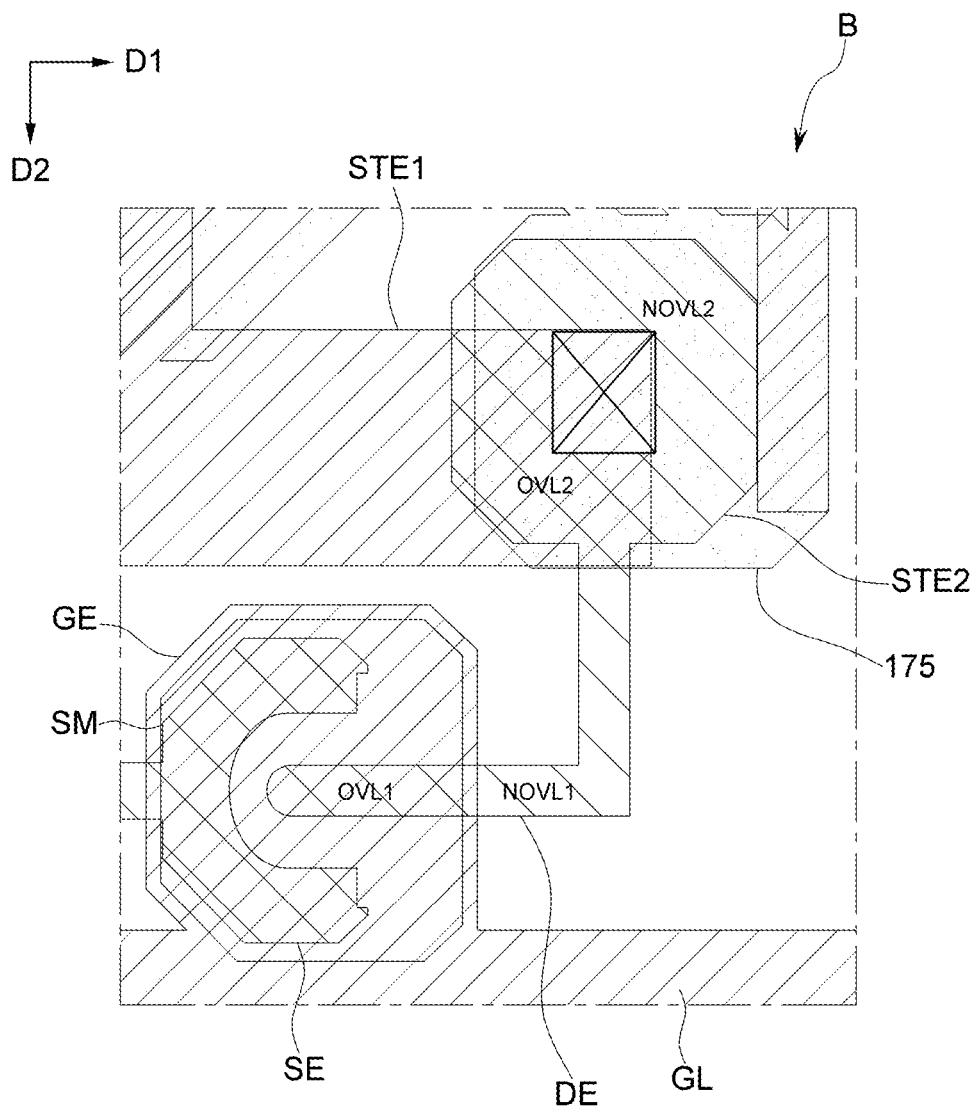
FIG. 10 and FIG. 11 are other enlarged views of the portion "B" of FIG. 7.
Figure 11:
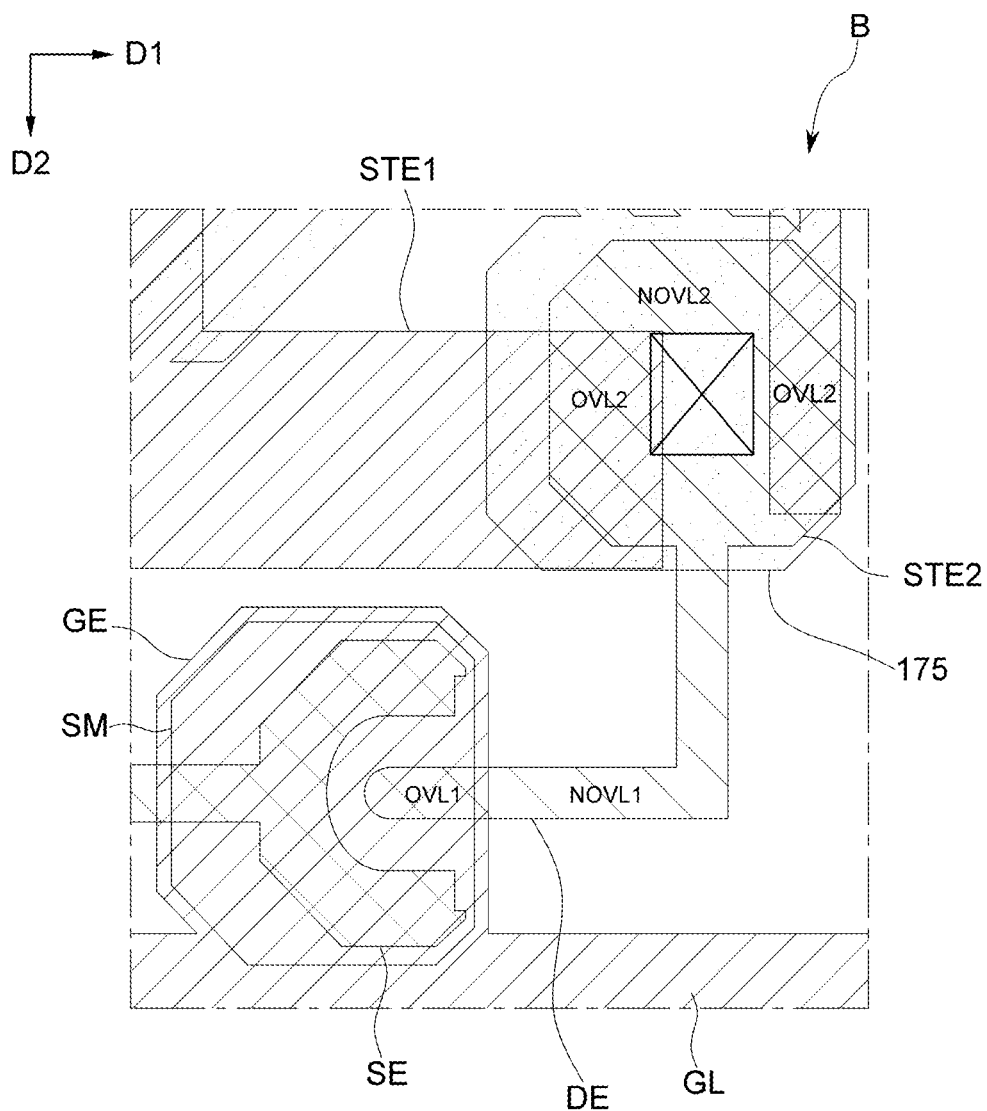

FIG. 7 is a plan view illustrating one pixel of a display device according to another exemplary embodiment of the present invention, FIG. 8 is a cross-sectional view taken along line II-II' in FIG. 7; FIG. 9 is a view enlarging a portion "B" of FIG. 7; and FIGS. 10 and 11 are other enlarged views of the portion "B" of FIG. 7.

Referring to FIG. 7, a gate electrode GE may have a shape protruding from a gate line GL in the second direction D2. The gate electrode GE and the gate line GL may be formed as a single unit.

A source electrode SE may have one of an "I" shape, a "C" shape, and a "U" shape. The source electrode SE extending from a data line DL and having a "C" shape is illustrated in FIG. 7, and a convex portion of the source electrode SE is directed toward the data line DL.

As illustrated in FIG. 7, a drain electrode DE may have a bent shape.

As illustrated in FIG. 8, one pixel includes a liquid crystal capacitor Clc, a storage capacitor Cst, and a parasitic capacitor Cgd.

The liquid crystal capacitor Clc is formed by overlap of a pixel electrode 170 and a common electrode 220. A liquid crystal layer 300 is controlled by the liquid crystal capacitor Clc to express a gray level of images.

The storage capacitor Cst is formed by overlap of a storage capacitor STE and the drain electrode DE. The storage capacitor Cst is formed to maintain a voltage of the pixel electrode 170, and serves to supplement the charge storage capability of the liquid crystal capacitor Clc.

The parasitic capacitor Cgd is formed by overlap of the drain electrode DE and the gate electrode GE.

Referring to FIG. 9, the drain electrode DE includes a non-overlap portion, a first overlap portion OVL1 overlapping the gate electrode GE, and a second overlap portion OVL2 overlapping the storage electrode STE.

The non-overlap portion includes a first non-overlap portion NOVL1 extending from the first overlap portion OVL1 and not overlapping a connection electrode 175 of the pixel electrode 170, and a second non-overlap portion NOVL2 not overlapping the storage electrode STE and overlapping the connection electrode 175 of the pixel electrode 170. In particular, according to another exemplary embodiment of the present invention, the drain electrode DE may extend in a bent shape, the first storage electrode STE1 may be spaced apart from the second storage electrode STE2, and the first non-overlap portion NOVL1 and the second non-overlap portion NOVL2 may contact each other.

The first overlap portion OVL1 overlaps the gate electrode GE. The first overlap portion OVL1 has a width Wd of about 3 μm to about 5 μm. As used herein, the width Wd of the first overlap portion OVL1 means a length of the first overlap portion OVL1 in the second direction D2.

The second overlap portion OVL2 and the second non-overlap portion NOVL2 overlap the storage electrode STE. The second overlap portion OVL2 and the second non-overlap portion NOVL2 have a width Wst of about 20 μm to about 40 μm. As used herein, the width Wst of the second overlap portion OVL2 and the second non-overlap portion NOVL2 means a length of the second overlap portion OVL2 and the second non-overlap portion NOVL2 in the second direction D2.

Accordingly, according to the present exemplary embodiment, the first overlap portion OVL1 may have an area of about 1/13 to about 1/4 of the area of the second overlap portion OVL2.

According to the present exemplary embodiment of the present invention, the first overlap portion OVL1 in which the gate electrode GE overlaps the drain electrode DE forms the parasitic capacitor Cgd, and the second overlap portion OVL2 in which the storage electrode STE overlaps the drain electrode DE forms the storage capacitor Cst. In such an exemplary embodiment, a capacitance of the parasitic capacitor Cgd is proportional to an area of the first overlap portion OVL1, and a capacitance of the storage capacitor Cst is proportional to an area of the second overlap portion OVL2.

According to the present exemplary embodiment, although the mask may be misaligned and the source electrode SE and the drain electrode DE may be shifted in the first direction D1 as illustrated in FIGS. 10 and 11, as compared with the source electrode SE and the drain electrode DE illustrated in FIG. 9, a ratio of the area of the first overlap portion OVL1 to the area of the second overlap portion OVL2 may be substantially the same. That is, although the mask is misaligned and the source electrode SE and the drain electrode DE are shifted along the first direction D1, a ratio of the capacitance of the parasitic capacitor Cgd formed by the first overlap portion OVL1 to the capacitance of storage capacitor Cst formed by the second overlap portion OVL2 may be substantially the same. Accordingly, as shown in Equation 2, the kickback voltage Vkb, which is determined by the ratio of the parasitic capacitor Cgd to the sum of the parasitic capacitor Cgd, the storage capacitor Cst, and the liquid crystal capacitor Clc may have a constant value.

Hereinafter, a display device according to still another exemplary embodiment of the present invention will be described with reference to FIG. 12.

Figure 12:
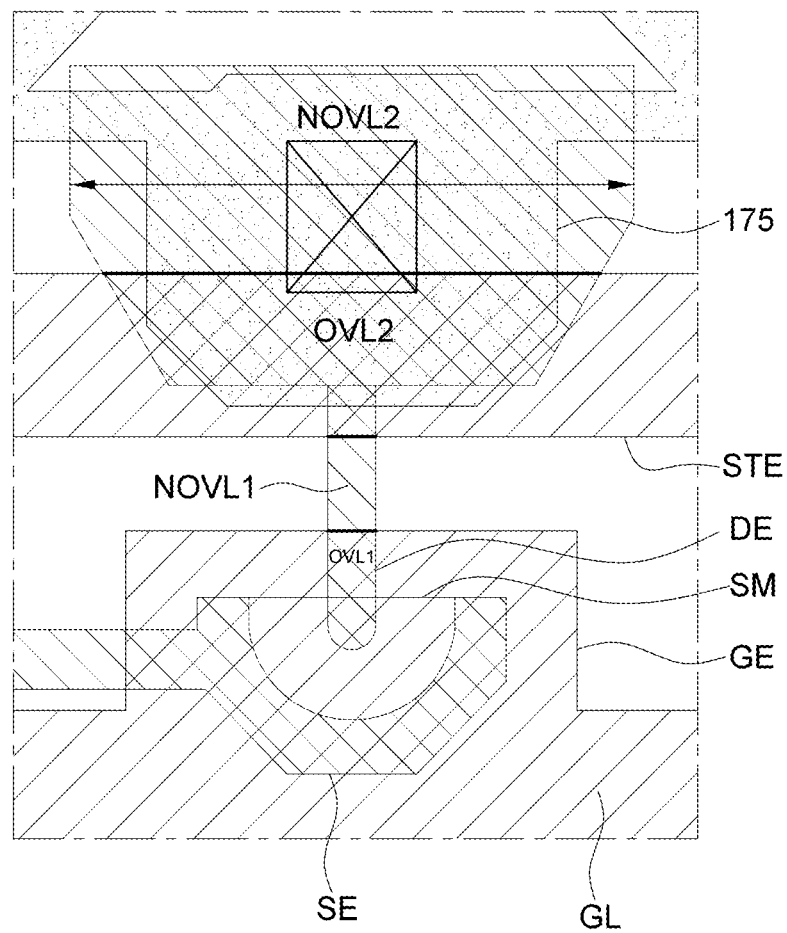
FIG. 12 is a plan view illustrating one pixel of a display device according to still another exemplary embodiment of the present invention.

FIG. 12 is a plan view illustrating one pixel of a display device according to still another exemplary embodiment of the present invention.

According to still another exemplary embodiment of the present invention, the second overlap portion OVL2 overlaps the storage electrode STE with an increasing width as the distance away from the first overlap portion OVL1 increases along the second direction D2. In particular, at least a portion of the second overlap portion OVL2 may overlap the storage electrode STE with a gradually increasing width as the distance away from the first overlap portion OVL1 increases along the second direction D2. In detail, in the second overlap portion OVL2 having a width gradually increasing as the distance from the first overlap portion OVL1 increases along the second direction, a rate of increase of the length in the first direction D1 of the second overlap portion OVL2 along the second direction D2 may be constant at about 1.0 or more and about 2.0 or less. For example, when the second overlap portion OVL2 is spaced apart from the first overlap portion OVL1 by about 10 μm in the second direction D2, a width of at least a portion of the second overlap portion OVL2 in the first direction D1 may gradually increase from about 22 μm to about 34 μm. In other words, at least a part of an edge of the second overlap portion OVL2 may include an inclined portion having a predetermined angle with respect to the first direction D1 and the second direction D2 on a plane.

In addition, at least a portion of the second non-overlap portion NOVL2 may have a gradually increasing width as the distance away from the first overlap portion OVL1 increases along the second direction D2.

According to still another exemplary embodiment of the present invention, the kickback voltage of the pixel may be more accurately maintained. Accordingly, display failure of the display device may be improved.

Hereinafter, a display device according to still another exemplary embodiment of the present invention will be described with reference to FIG. 13.

Figure 13:
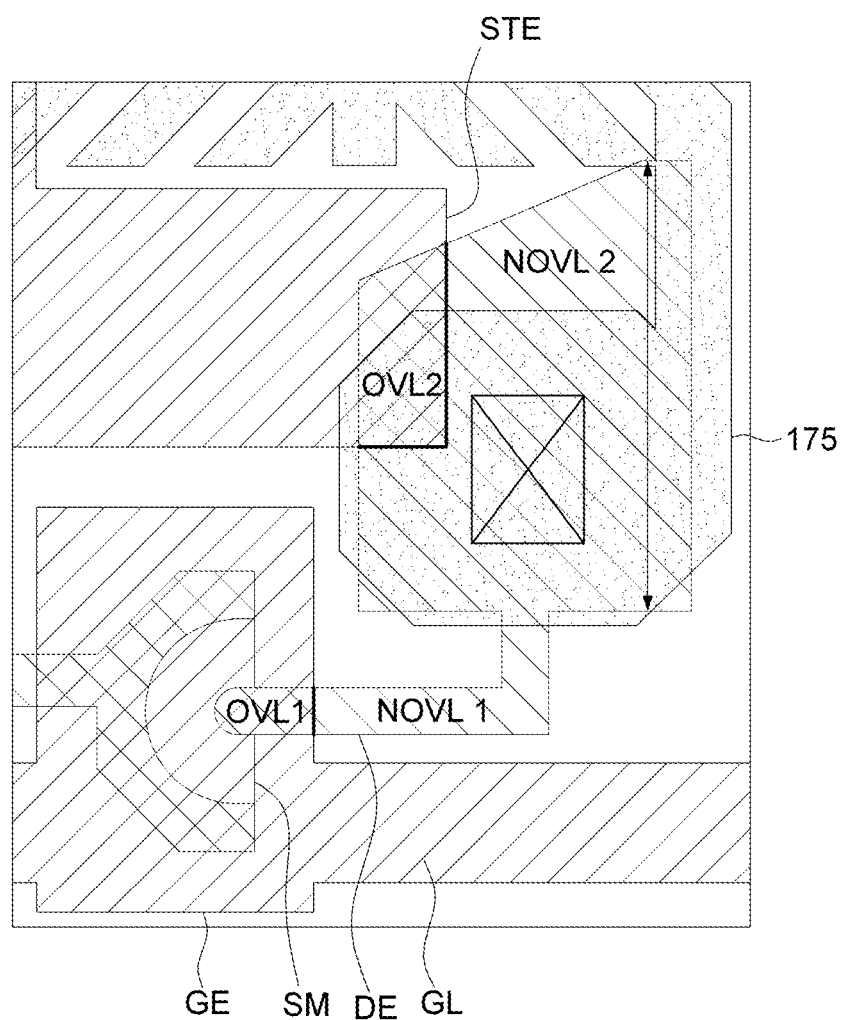
FIG. 13 is a plan view illustrating one pixel of a display device according to another exemplary embodiment of the present invention.

FIG. 13 is a plan view illustrating one pixel of a display device according to still another exemplary embodiment of the present invention.

According to still another exemplary embodiment of the present invention, the second overlap portion OVL2 has a larger width as the distance away from the first overlap portion OVL1 increases along the first direction D1. In particular, the second overlap portion OVL2 may have a gradually increasing length in the second direction D2 as the distance away from the first overlap portion OVL1 increases along the first direction D1. In specific, in the second overlap portion OVL2 having a length gradually increasing as the distance from the first overlap portion OVL1 increases along the first direction D1, a rate of increase of the length in the second direction D2 of the second overlap portion OVL2 along the first direction D1 may be constant at about 0.3 or more and about 0.5 or less. For example, when the second overlap portion OVL2 is spaced apart the first overlap portion OVL1 by about 18 μm along the first direction D1, the length of the second overlap portion OVL2 in the second direction D2 may gradually increase from about 22 μm to about 30 μm. In other words, at least a part of an edge of the second overlap portion OVL2 may include an inclined portion having a predetermined angle with respect to the first direction D1 and the second direction D2 on a plane.

In addition, at least a portion of the second non-overlap portion NOVL2 may have a gradually increasing length in the second direction D2 as the distance away from the first overlap portion OVL1 increases along the first direction D1.

According to still another exemplary embodiment of the present invention, the kickback voltage of the pixel may be more accurately maintained.

As set forth hereinabove, according to one or more exemplary embodiments, the display quality of the display device may be improved because the kickback voltage does not fluctuate even though the source electrode and the drain electrode are misaligned due to mask misalignment.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a first substrate;
a gate line extending along a first direction on the first substrate;
a data line disposed on the first substrate, insulated from the gate line, and extending along a second direction that intersects the first direction;
a gate electrode protruding from the gate line;
a source electrode extending from the data line;
a drain electrode spaced apart from the source electrode;
a pixel electrode electrically connected to the drain electrode; and
a storage electrode spaced apart from the gate line and the gate electrode,
wherein:
the drain electrode comprises a first overlap portion overlapping the gate electrode and a second overlap portion overlapping the storage electrode;
the second overlap portion overlaps at least a part of the pixel electrode;
the drain electrode comprises a non-overlap portion extending from the second overlap portion and not overlapping the storage electrode and the gate electrode; and
the non-overlap portion comprises:
a first non-overlap portion positioned between the first overlap portion and the second overlap portion; and
a second non-overlap portion extending in a direction away from the first non-overlap portion.

2. The display device of claim 1, wherein the drain electrode has an "I" shape.

3. The display device of claim 2, wherein the first overlap portion has a length of about 3 to about 5 μm in the first direction, and the second overlap portion has a length of about 20 μm to about 40 μm in the first direction.

4. The display device of claim 2, wherein a length of the second overlap portion overlapping the storage electrode increases as a distance away from the first overlap portion increases.

5. The display device of claim 2, wherein a length of at least a portion of the second overlap portion overlapping the storage electrode gradually increases as a distance away from the first overlap portion increases.

6. The display device of claim 1, wherein the first overlap portion has an area of about 1/13 to about 1/4 of an area of the second overlap portion.

7. A display device comprising:
a first substrate;
a gate line extending along a first direction on the first substrate;
a data line disposed on the first substrate, insulated from the gate line, and extending along a second direction that intersects the first direction;
a gate electrode protruding from the gate line;
a source electrode extending from the data line;
a drain electrode spaced apart from the source electrode;
a pixel electrode electrically connected to the drain electrode; and
a storage electrode spaced apart from the gate line and the gate electrode,
wherein:
the drain electrode comprises a first overlap portion overlapping the gate electrode and a second overlap portion overlapping the storage electrode, the second overlap portion overlaps at least a part of the pixel electrode, the drain electrode comprises a non-overlap portion extending from the second overlap portion and not overlapping the storage electrode and the gate electrode; and
the non-overlap portion comprises:
a first non-overlap portion extending from the first overlap portion and not overlapping the pixel electrode; and
a second non-overlap portion overlapping at least a portion of the pixel electrode.

8. The display device of claim 7, wherein the drain electrode is bent.

9. The display device of claim 8, wherein the first overlap portion has a length of about 3 μm to about 5 μm in the second direction, and the second overlap portion has a length of about 20 μm to about 40 μm in the second direction.

10. The display device of claim 8, wherein a length of the second overlap portion overlapping the storage electrode gradually increases as a distance away from the first overlap portion increases.

11. A display device comprising:
a first substrate;
a gate line disposed on the first substrate and extending along a first direction;
a data line disposed on a second substrate, the data line extending along a second direction that intersects the first direction;
a gate electrode protruding from the gate line;
a storage electrode spaced apart from the gate electrode,
a source electrode extending from the data line; and
a drain electrode spaced apart from the source electrode, and comprising a first overlap portion overlapping the gate electrode, a second overlap portion overlapping the storage electrode, and a non-overlap portion extending from the first overlap portion and the second overlap portion and not overlapping the storage electrode,
wherein the non-overlap portion comprises a first non-overlap portion extending from the first overlap portion and not overlapping the pixel electrode, and a second non-overlap portion extending from the second overlap portion and overlapping at least a portion of the pixel electrode.

12. The display device of claim 11, wherein the drain electrode has an "I" shape.

13. The display device of claim 12, wherein the first overlap portion has a length of about 3 μm to about 5 μm in the first direction, and the second overlap portion has a length of about 20 μm to about 40 μm in the first direction.

14. The display device of claim 12, wherein a length of the second overlap portion overlapping the storage electrode increases as a distance away from the first overlap portion increases.

15. The display device of claim 12, wherein a length of at least a portion of the second overlap portion overlapping the storage electrode gradually increases as a distance away from the first overlap portion increases.

16. The display device of claim 11, wherein the drain electrode is bent.

17. The display device of claim 16, wherein the first overlap portion has a length of about 3 μm to about 5 μm in the second direction, and the second overlap portion has a length of about 20 μm to about 40 μm in the second direction.

18. The display device of claim 16, wherein a length of the second overlap portion overlapping the storage electrode gradually increases as a distance away from the first overlap portion increases along the first direction.

\* \* \* \* \*